4 Sheets--Sheet 1.

D. E. SOMES.

Improvement in Cooling Air, Liquids, &c.

No. 130,250. Patented Aug. 6, 1872.

Attest:
B. R. Somes
Edw. F. Brown

Inventor:
D. E. Somes

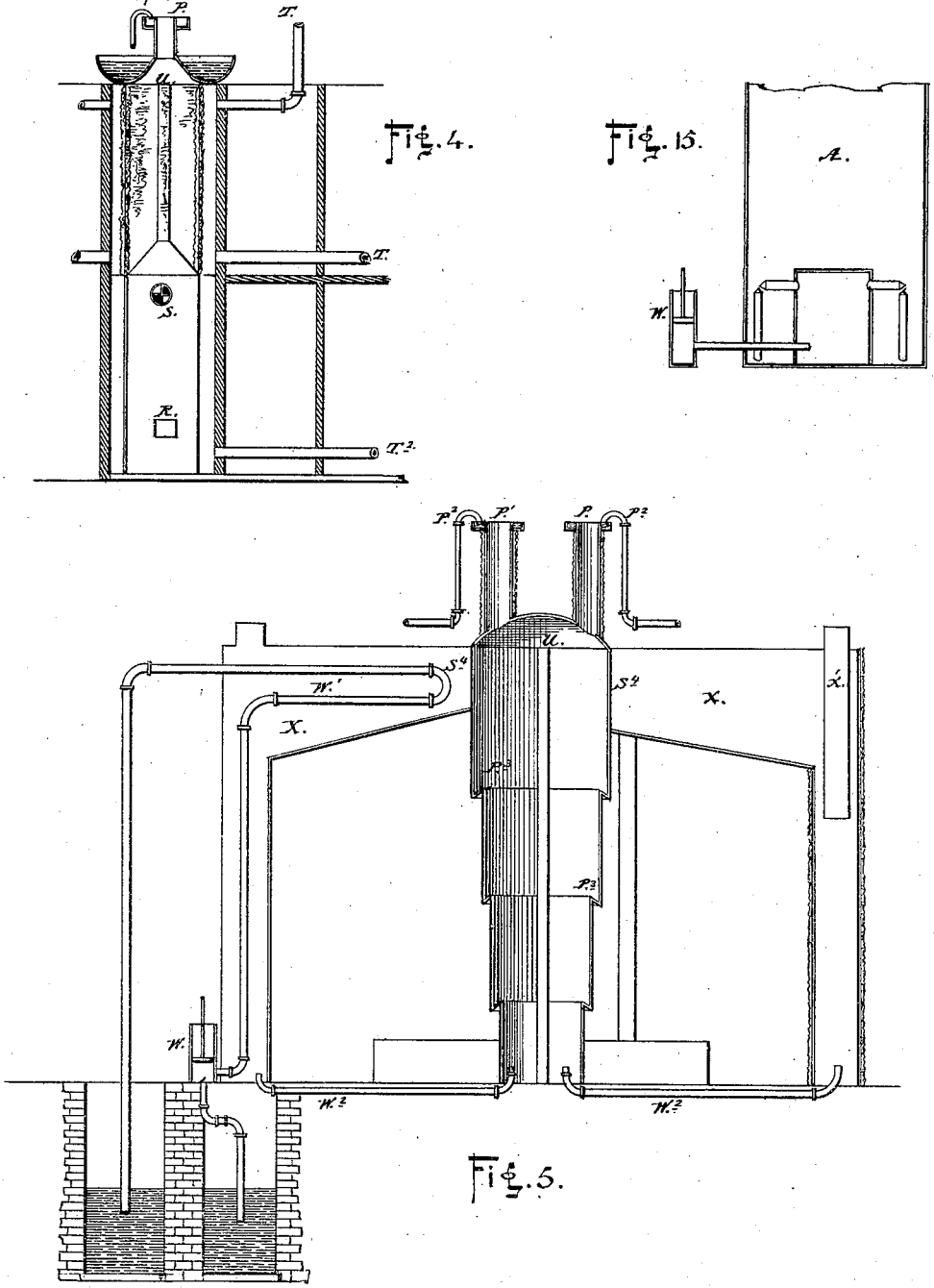
D. E. SOMES.
Improvement in Cooling Air, Liquids, &c.
No. 130,250.  Patented Aug. 6, 1872.

D. E. SOMES.

Improvement in Cooling Air, Liquids, &c.

No. 130,250. Patented Aug. 6, 1872.

Attest:
B. R. Somes
Edw. F. Brown

Inventor:
D. E. Somes

D. E. SOMES.
Improvement in Cooling Air, Liquids, &c.
No. 130,250. Patented Aug. 6, 1872.
Fig. 9.
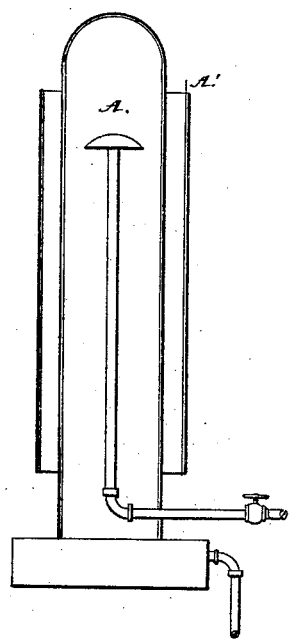
Fig. 10.
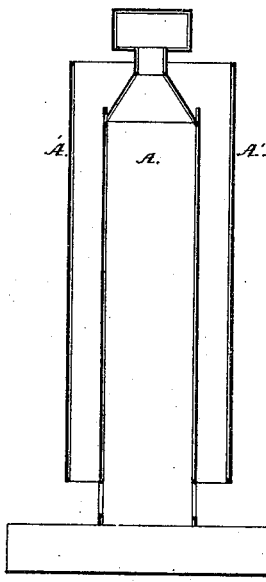
Fig. 11.
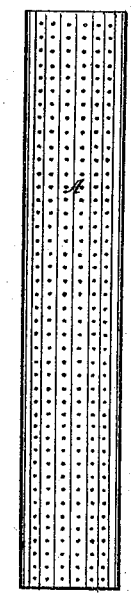
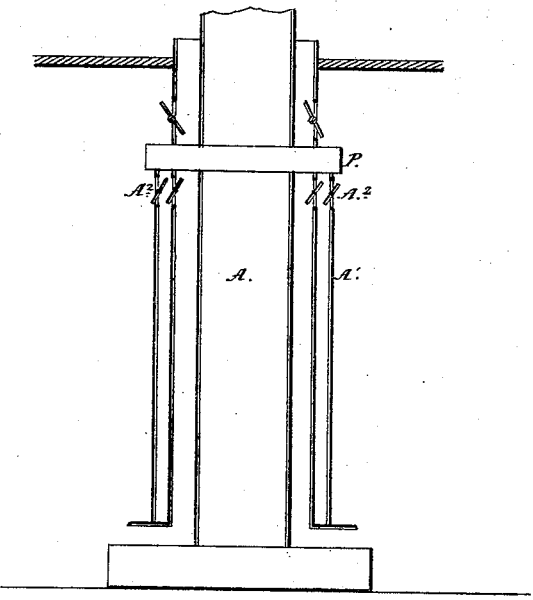
Fig. 12.
Attest:
B. R. Somes
Edw. F. Brown
Inventor:
D. E. Somes

UNITED STATES PATENT OFFICE.

DANIEL E. SOMES, OF WASHINGTON, DISTRICT OF COLUMBIA.

IMPROVEMENT IN COOLING AIR, LIQUIDS, &c.

Specification forming part of Letters Patent No. 130,250, dated August 6, 1872.

SPECIFICATION.

*To all whom it may concern:*

Be it known that I, DANIEL E. SOMES, of Washington, District of Columbia, have invented a new and useful Improvement in Cooling Air, and Liquids, and Buildings, and Apartments; and I do hereby declare that the following is a full, clear, and exact description thereof.

My invention relates to cooling buildings, apartments, cars, ships, and other vessels; to preserving food and other articles. It also relates to cooling, purifying, and oxygenizing the atmosphere, so that the same quality and temperature of air which is found on the mountain-top or at the sea-side may be secured and inhaled in private and public buildings in the densest populated cities in any climate and during the hot season of the year. My invention consists in the construction, arrangement, and combination of apparatus hereinafter described, and as shown in the accompanying drawing, and in connection therewith the process of vaporizing and evaporating the more volatile and other liquids, as water, ether, ammonia, and the like, which will produce the desired result—namely, reducing the temperature.

Figure 1:
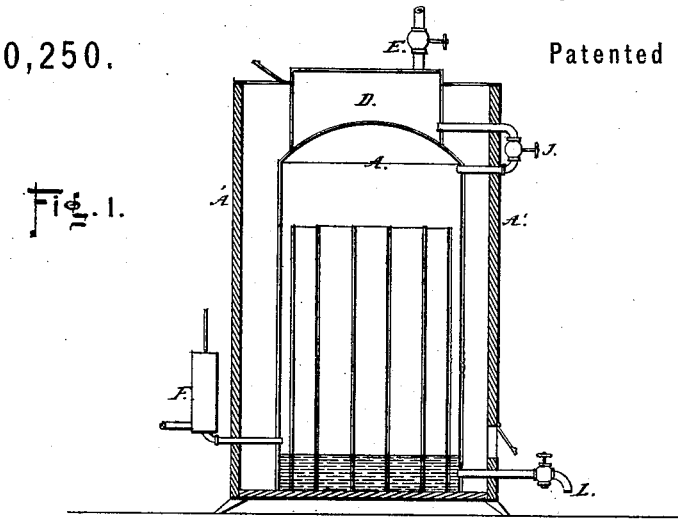
Figure 2:
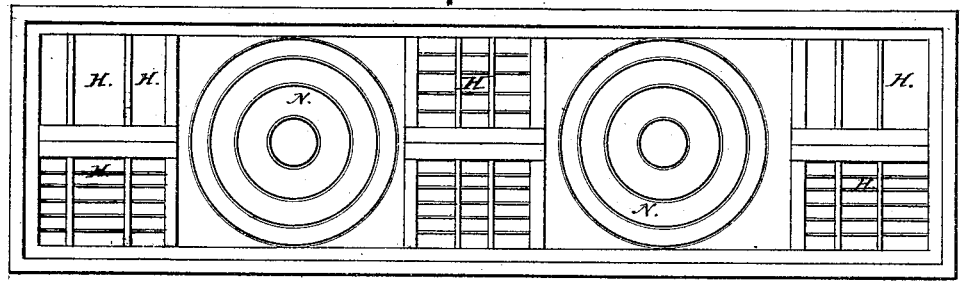
Figure 13:
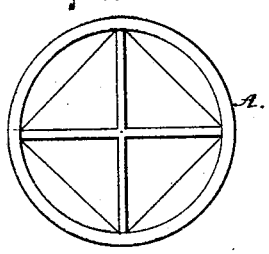
Figure 14:
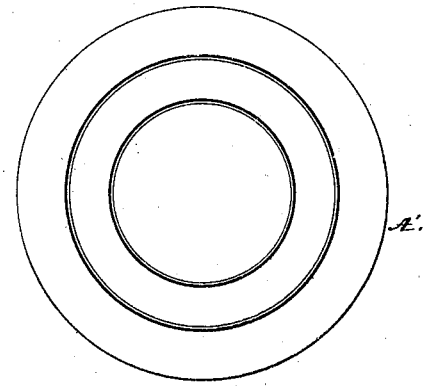

Figures 1, 3, 4, and 5 represent a vertical section of a hollow shaft or cylinder. Fig. 2 is a horizontal section, showing in plan view a tank, in which rest the lower ends of the cylinders, surrounded by chambers for holding articles to be preserved or cooled. Figs. 6, 7, 8, 9, 10, 11, and 12 represent upright cylinders, made of sheet metal, wood, glass, wire-gauze, wire frame of any form, or of any material suitable for the purpose. Figs. 13 and 14 represent basins or receptacles for containing water and the lower ends of the cylinders. Fig. 15 represents a cylinder with atomizers arranged therein for throwing the liquid more rapidly into vapor, and thereby more readily reducing the temperature.

To enable those skilled in the art to make and use my invention, I will proceed to describe its construction and mode of operation.

Figure 3:
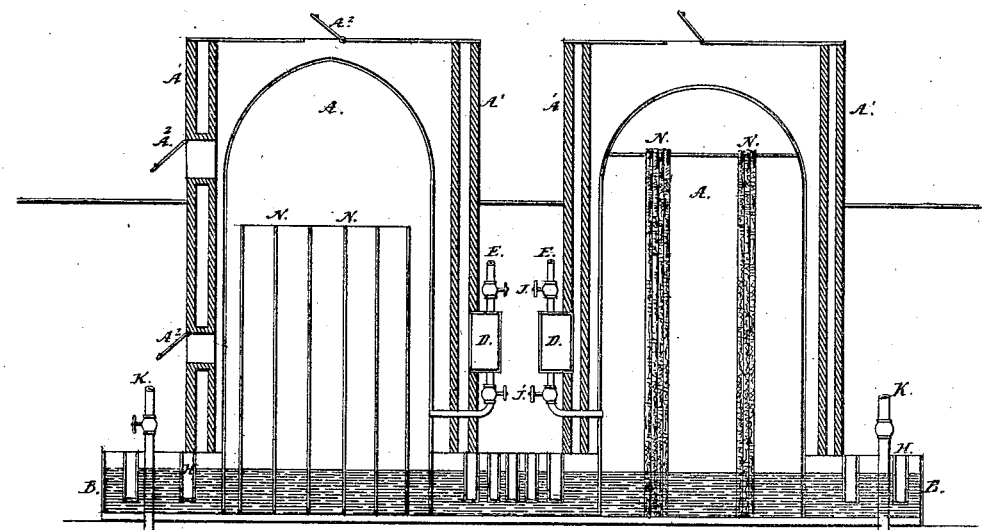
Figure 6:
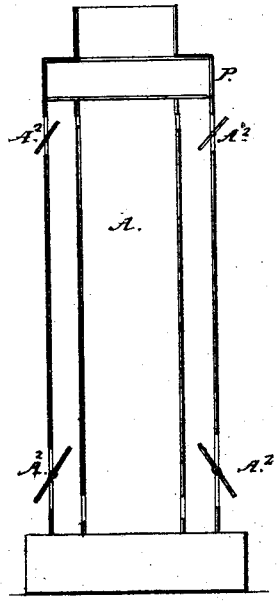

The apparatus shown in Figs. 2, 3, and 5 is more especially designed to be used in connection with preserving-tanks, and in cooling air to be conducted into apartments or tanks below, as well as cooling the buildings or rooms in which they may be situated. The cylinder is made perfectly air-tight, so that the vapor rising from the volatile liquids used therein cannot escape. This apparatus consits, essentially, in an upright shaft, A, shown as cylindrical in form, but which may have any other form of convenient or necessary height or diameter—the higher the more effective in producing cold. Its lower end rests in the tank B, and is surrounded by chambers containing articles to be preserved or cooled. That portion of the cylinder which extends above the tank B is surrounded by a wall or casing, $A^1$, to exclude the effects of the surrounding atmosphere, and the casing may be single, double, or multiple. Its lower end which enters the tank is left without any casing, to permit of the ready conduction of heat and cold. The top of the cylinder is closed and made air-tight. The top of casing is, in some instances, closed by a head, $A^1$, in which, and also in the sides, are valves $A^2$, arranged so that a communication between the outside of the cylinder and the external atmosphere through the casing may be opened for the purpose of cooling the room in which the apparatus is placed. The cylinder is made with an oval, conical, or flat top. A series of small cylinders is placed within the large one. D D are vessels into which volatile liquids are conducted through the tubes E, after which the stop-cocks or valves J are closed, and those of $J'$ are opened for the purpose of admitting the liquid to the cylinder without loss. F is an air-pump for exhausting the air from the cylinder, when desired. L is a cock for drawing off the liquid. K K are tubes for conducting air through the cold tank to a room below, having valves to regulate the volume. Fig. 4 shows another method of cooling a room below the liquid, with a door, R, and a ventilator, S. T is a tube to conduct air to be cooled down the channel around the cylinder, and $T^1$ $T^2$ to conduct it after it has been cooled to any apartment or place desired. Fig. 5 differs in some respects from the others. Means are used for condensing vapors which are not shown in the other figures, though they may be applied to all, if necessary. The pump W is designed to draw water from a well or other body of water and force it through the pipe $W^1$, said pipe extending through an air tube or chamber, X, which communicates with the interior of the cylinder through an opening at $S^4$. The vapor forces itself into the chamber X, and, coming in contact with the pipe $W^1$, is immediately condensed into liquid, and runs back through the pipe $W^2$ to the bottom of the cylinder, to again rise in the form of vapor, to be again condensed, and so repeating the operation. The evaporators P are also used for condensing vapor, the tubes being covered with fibrous material, and kept wet from water held in the basin $P^1$, or from jets of water from a pipe striking against the covering. Air passing over or against the wet covering will produce evaporation, and consequently produce cold on the walls of the tubes, and cool the air within them. The water is supplied through a water-pipe, $P^2$, or by any convenient means. The recesses $P^3$ are designed to arrest a portion of the liquid as it runs down the walls of the cylinder after it has been condensed, so that it may again vaporize before it reaches the bottom of the cylinder—a lower and consequently a colder altitude. Tube $X'$ is designed to receive ice or ice and salt or other cold substance, to produce rapid condensation of the vapor. N represents fibrous coverings or linings of cylinders or frames and fibers or porous substances within gauze or perforated tubes, or masses of such material as sponge, moss, cotton, tow, sawdust, or any absorbent substance placed in a vertical position, so that, while the base of such substance shall rest in a liquid, the liquid will be absorbed and, by the process of capillary attraction, carried upward. When the mass is saturated with the liquid it will fly off in form of vapor and carry with it a portion of the latent heat contained in the liquid. If the vapor is allowed to rise and escape through the top of the cylinder or through its side into a flue or place outside the room where it is placed the temperature will be lowered in and around the cylinder, and if the registers or dampers $S^1$ be opened the air around the cylinders will, it being colder and heavier than that in the warm room, fall out through the lower register, and warm air will pass through the upper one to take its place and be cooled on its passage down. This current of air will continue until the air in the room becomes the same in temperature as that inside of the casing surrounding the cylinder, and the temperature in the room can be regulated by opening and closing the registers. The basins, Figs. 13 and 14, which contain the lower end of the fibrous substance, are kept filled with water; and, as shown in some of them, water is also conducted to the top of the fibrous substance by means of a perforated pipe inclosed within it or standing near it so that water-jets may reach it.

Figure 7:
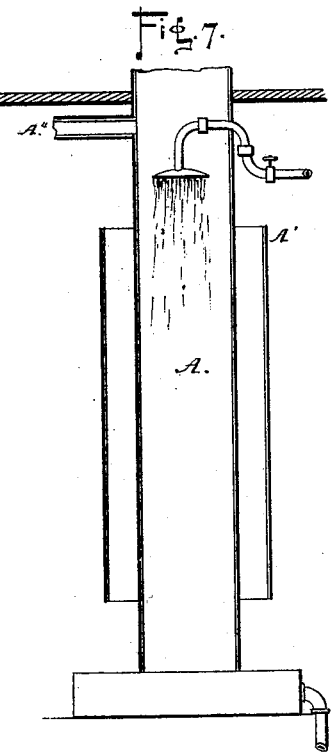

Figs. 7 and 9 show a shower-bath so arranged as that it may be used to wet the fiber or used without the fiber.

Figs. 4, 5, 6, 10, and 12 show basins at the top of the cylinders for containing water to be let out gradually onto the fiber to keep it wet, these basins being supplied by water-pipes from the water-pipes of ordinary water-supply in large cities, from wells, pumped up, or in any convenient way. If these pipes are extended to a cool point in the ground in a system, or are connected with a large pipe or reservoir deep in the earth, the water will be cooled, and will consequently produce a lower temperature in the apparatus and rooms to be cooled. If blowers or air-pumps are applied to the fibrous material the temperature will be lowered thereby. A thin metallic casing or skirt surrounding the fibrous substance will serve to condense the vapor and conduct it in the form of liquid to the basins below, thereby preventing the air in the room from becoming too moist. It may be perforated or have openings at the bottom or at other points to give free circulation to the air in the channel; or the metallic skirt may be used to form the casing instead of wood or other material. The lower end of it may be raised above the basin to give free circulation of air and ready access to the basins 13 and 14; but in this case the flow of air, and consequently the temperature of the room, cannot be regulated as by having registers or dampers.

Figure 8:
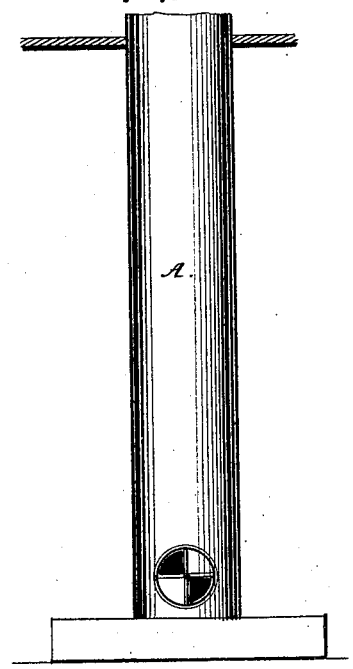

An end view of a very cheap form of cooler is shown at Fig. 13. This is made by taking a board and nailing a strip on each side, running along the center, which forms a cross. A strip of Canton flannel or some other cloth is lapped around and tacked, the lower end being also covered and placed in the basin of water. Other absorbent material may be placed inside the casing, if desired. After standing a while in the water it will absorb the water and throw it off in the form of vapor; and if the vapor or the heat therefrom be allowed to escape from the room through an opening the room will become perceptibly cooler; or, instead of this, a mass of absorbent material may be placed in a vessel containing liquid and placed in a room to be cooled with proper ventilation. If the vessel has a cover properly fitted so as to be swung or raised or opened by degrees, cooling results may be secured at a cheap rate. By placing atomizers in the air-tight cylinders and fanning air through the horizontal tube intense cold may be produced and ice manufactured. The heat should be carried off by such means as are represented in Fig. 5, or by some other convenient means. These coolers are made portable or stationary, as circumstances or taste may require, and are designed for one, two, or more stories. In the latter case they extend through the ceiling, as shown in Figs. 7, 8, and 12. A tube extending through the casing shown at $A^4$, Fig. 7, is intended to serve as a ventilating-pipe, which may extend through the outside wall of the building or room in which it is placed, to let in the fresh air. The air passing into the apparatus is cooled on its passage into the room, and is also relieved of dust, smoke, and other impurities by the vapor with which it comes in contact.

Figure 16:
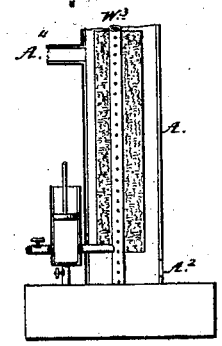

Fig. 16 represents an apparatus comprising the basins 13 and 14, the water-pipe $W^3$ extending from the basin up through fibrous substance, with the casing, or it may be used without the casing. The pipe has perforations to let out water-jets, and is connected with a pump having two pipes with a valve or stop-cock in each, or two branches with a two-way cock. By closing one valve and opening the other water will be drawn from the basin and forced up within the fibrous substance and out through minute holes. By reversing the valves air will be drawn from the room or from without through the other branch of pipe and forced up into the fibrous substance instead of the water, thus cooling more rapidly than without such pump.

What I claim as new, and desire to secure by Letters Patent, is—

1. The basin, cylinder or frame, fibrous or porous substance, and liquid, as and for the purpose set forth.

2. The basin, fibrous substance, liquid, and supply-pipe, as and for the purpose set forth.

3. The basin, fibrous substance, liquid, supply-pipe, and pump, as and for the purpose set forth.

4. The evaporators, fibrous substance, supply-pipe, cylinder, or frame, as and for the purpose set forth.

5. The absorbent material, basin, supply-pipe, pump, liquid, casing, and means for ventilating, substantially as and for the purpose set forth.

6. The above with means for condensing vapor, as and for the purpose set forth.

7. The process of producing cold by the means herein described.

D. E. SOMES.

Witnesses:
 EDM. F. BROWN,
 WM. G. HENDERSON.